United States Patent Office 3,835,053
Patented Sept. 10, 1974

---

3,835,053
LUBRICATING COMPOSITIONS
Dale J. Meier, Midland, Mich., and David J. St. Clair, Bethalto, Ill., assignors to Shell Oil Company
No Drawing. Filed Nov. 13, 1972, Ser. No. 306,086
Int. Cl. C10m 1/18
U.S. Cl. 252—59                                   7 Claims

ABSTRACT OF THE DISCLOSURE

Lubricating oil compositions for internal combustion engines contain as a thickener and viscosity index improving agent a minor but effective amount of a hydrogenated isoprene homopolymer having been produced by solution polymerization with a lithium-hydrocarbyl initiator and having a 1,4-content prior to hydrogenation of at least 85% and an average molecular weight between about 40,000 and 225,000, said polymer having been hydrogenated sufficiently to reduce at least about 80% of its double bonds. The compositions have excellent shear stability and can be formulated to pass multi-grade engine oil classifications.

Background of the Invention

This invention relates to novel lubricating compositions and the like, containing a critically defined hydrogenated isoprene homopolymer preferably combined with an effective amount of a pour point depressant. Unless otherwise indicated, the term "lubricant, lubricating oil, or lubricating compositions" refers to lubricating oils for internal combustion engines such as gasoline engines or diesel engines.

Description of the Prior Art

The art of lubricating oil formulation has become increasingly complex with the evermore stringent demands made by the automotive industry. One of the primary requisites is to provide an economical lubricant which can be utilized over a wide range of operating conditions, especially insofar as temperature variations are concerned. At the same time, the formulated lubricant must also possess an ability to impart oxidative stability, wear inhibition, shear stability and the like during its use as well as during storage. Furthermore, the automotive industry desires lubricants which will stay in their SAE viscosity grades for a substantial length of time under both use and storage conditions.

By "multi-grade lubricants" is meant lubricants which meet a 0° F. viscosity specification and a 210° F. viscosity specification, such as is shown for motor oils by the following table derived from SAE, J300a taken from the SAE Handbook for 1969:

| SAE oil grade specification | Viscosity at 0° F., poises | SAE oil grade specification | Viscosity at 210° F. SUS |
|---|---|---|---|
|  |  | 20 | 45–58 |
| 5W | ¹12 | 30 | 58–70 |
| 10W | 12–24 | 40 | 70–85 |
| 20W | 24–96 | 50 | 85–110 |

¹ Maximum.

According to the table, for example, an SAE 10W/50 oil must have a viscosity at 0° F. between 12 and 24 poises and a viscosity at 210° F. of between 85 and 110 SUS.

A large variety of polymeric additives have been employed primarily as thickening agents, viscosity index (VI) improvers and pour point depressants. A common limitation of essentially all of these is shear sensitivity. This is not unexpected, since most of these polymers are relatively high molecular weight materials and consequently are readily subject to shear degradation. On the other hand, relatively low molecular weight polymeric materials, at least up to the present time, have proven for the most part to be relatively ineffective as thickeners or VI improvers in automotive engine lubricants, even though they may have reasonably good shear stability.

Among the many types of polymers which have been proposed for modifying lubricating compositions in the past are hydrogenated sodium-polymerized conjugated dienes (such as polyisoprene) as disclosed in U. S. Pat. 2,798,853. However, as the working examples given hereinafter will show, the oily sodium polymers suggested by the latter patent are unsatisfactory in that they exhibit a high sensitivity to shear; thus, any lubricating composition containing them will show a rapid reduction in its viscosity and its viscosity index once the composition is being subjected to shearing action. The reason for this is not clear. However, it is known in the polymer art that the use of sodium for diene polymerization results in a product which has a wide spread in molecular weight species.

The use of lithium based initiators for the preparation of polymers from conjugated dienes is well known in the polymer art. It has been determined that soluble and active lithium based initiators result in solution polymers having a relatively narrow molecular weight range, and, in the absence of polar modifiers such as ethers and the like the resulting polymers have a 1,4-content usually in excess of about 85%. The average molecular weight is controlled by the proportion of intiator relative to the proportion of diene monomer. The higher the proportion of lithium based initiator, the lower will be the average molecular weight of the resulting polymer.

Natural diene polymers are also known such as natural rubber. This is polyisoprene which not only has a relatively wide spread in molecular weight species, containing cross-links to some degree to form gel. Also it contains non-rubbery constituents such as gums, sugars and the like which would interfere with many high efficiency hydrogenation catalysts. The average molecular weight of natural rubber is in the order of 1–3 million and thus the polymer, due to its relatively high average molecular weight, is highly subject to shear degradation. Moreover, again due to its high average molecular weight, it is relatively difficult to disperse natural rubber in lubricating oils either before or after hydrogenation. Furthermore, due to its high molecular weight it is virtually impossible to incorporate more than a small amount in lubricating oil; thus natural rubber or its hydrogenated derivative are not regarded as satisfactory lubricating oil additives.

OBJECTS OF THE INVENTION

It is an object of the present invention to provide improved lubricating compositions. It is another object of the present invention to provide improved multi-grade lubricants. It is a particular object of the invention to provide lubricating compositions having improved viscosity index and relatively low sensitivity to shear. Other objects will become apparent during the following detailed description of the invention.

Statement of the Invention

Now, in accordance with the present invention, lubricating compositions are provided comprising a lubricating oil having a viscosity index of at least about 85 and a minor but effective viscosity index improving amount of a hydrogenated homopolymer of isoprene, said polymer having been produced by solution polymerization with a lithium-based initiator, having a 1,4-content prior to hydrogenation of at least about 85% and an average molecular weight between about 40,000 and 225,000, said polymer having been hydrogenated sufficiently to reduce at least about 80% of its double bonds.

DESCRIPTION OF THE PREFERRED EMBODIMENTS

In accordance with this invention it has been found that hydrogenated homopolymers of isoprene having the above limitations, particularly when combined with a high viscosity index lubricant containing preferably a pour point depressant exhibit outstanding characteristics not possessed by other polymeric thickeners such as those produced by sodium polymerization of conjugated dienes.

The process for polymerization of isoprene in solution using lithium hydrocarbyl initiators is well known. By "lithium hydrocarbyl initiator" is meant an initiator in which the anionic metal is lithium. This includes particularly lithium alkyls, such as lithium isopropyl, lithium secondary butyl and the like. The preferred species is lithium secondary butyl. Other alkyls having up to about 8 carbon atoms in the alkyl radical may be employed. Polymerization is conducted in hydrocarbon solution, preferably in an inert solvent such as, cyclohexene, alkanes, such as butane or pentanes or the corresponding alkenes, as well as mixtures thereof. When the predetermined average molecular weight has been achieved, the polymerization may be "killed" by the addition of a hydrogen donor such as an alcohol, e.g., methanol or the like.

The precursor isoprene homopolymer is subjected to hydrogenation preferably carried out in the same solvent in which the polymer was prepared and also preferably utilizing as an hydrogenation catalyst the reaction product of an aluminum alkyl compound and a nickel or cobalt carboxylate or alkoxide. Catalysts of this type are disclosed in U.S. Pat. 3,595,942. A favored catalyst is the reaction product formed from triethyl aluminum and nickel octoate. The temperatures, pressures and times employed in the hydrogenation step are adjusted as shown in the above patent to cause hydrogenation of at least about 80% of the double bonds of the polymer up to essentially complete hydrogenation. The extent of hydrogenation is readily controllable and may be varied with the specific objectives for utilization of the polymer.

When the lubricant is intended for gasoline engines and the like, it is preferred that hydrogenation be carried to virtual completion. By this is meant hydrogenation of at least about 99.5% of the double bonds and preferably still higher.

It is convenient to prepare concentrates of the hydrogenated polymer in lubricating oils for later preparation of the lubricating oil compositions. Such concentrates suitably contain up to about 20% of the hydrogenated polymer and preferably between about 2.5 and 15% by-weight depending upon the particular polymer molecular weight and species.

Where in the present specification and claims reference is made to molecular weights, these are meant to refer to number average molecular weights as determined for example by tritium counting techniques or osmotic pressure methods.

While the average molecular weight of the hydrogenated polymers may lie between about 40,000 and 225,000, it is preferred to employ polymers having an average molecular weight between about 65,000 and 125,000. Furthermore it is preferred that the 1,4-content of the non-hydrogenated precursors be at least 92%.

The homopolymers employed in the preparation of the hydrogenated additives may be either linear or branched depending upon their specific process of preparation. The linear polymers are prepared as referred to above, namely, by simple anionic soution polymerization employing a lithium based catalyst. Linear polymers also may be prepared for use in the compositions of this invention by a coupling process in which the coupling agent is difunctional, such as a dihalo alkene or alkane. Coupling invoves addition of the coupling agent to a solution containing the "living" polymer which is associated at one end of the polymer chain with the lithium ion. Upon addition of the difunctional coupling agent, reaction occurs between the lithium ion and the halo substituents of the agent causing coupling of two chains to form a linear polymer of twice the molecular weight of the living polymer. Of course, other difunctional coupling agents known in the art may be employed for this purpose such as carbon monoxide, carbon dioxide, and other known coupling agents.

Branched homopolymers may be employed as well. In this latter case, polyfunctional coupling agents are utilized to result in a coupled product having a branched or radial configuration. Such couping agents and coupling processes are already known in the art. A preferred type of coupling agent comprises a silicon halide such as silicon tetrachloride. Other suitable coupling agents include di-esters of monohydric alcohols and dicarboxylic acids such as, diethyl adipate and the like. It is possible to couple living homopolymers of the same or of different average molecular weights forming either a completely symmetrical branched coupled product or one in which one or more of the branches differs from the remainder of the coupled molecule in its backbone carbon atom length or in some other respect.

The pour point depressants utilized in accordance with the present invention and in conjunction with the polymers as defined above are employed primarily for their pour point depressing effect although many of them may act as viscosity index improvers or thickeners. However, since they are employed in minor (pour point depressing) amounts, e.g., 0.1–2.5% by weight, preferably 0.15–0.7% by weight, their proportion is normally too small to have an appreciable effect upon oil properties other than pour point. It is desirable that the pour point depressant be present, however, since the hydrogenated polyisoprenes defined above exhibit essentially no effective pour point depressant function. On the other hand, one of the prime characteristics of the above class of polymers is their effective response to added pour point depressants such as high molecular weight copolymers of alkyl acrylates or alkyl methacrylates as well as nitrogen containing acrylic esters. By the term "acrylic esters" is meant esters of acids of the acrylic acid series including both acrylic acid and methacrylic acid.

Nitrogen-containing acrylic ester polymers can be prepared by any suitable means such as described in Hughes et al. U.S. Pat. 3,215,632 issued Nov. 2, 1965, and can be illustrated by the following examples: Nitrogen-containing polymers, namely, copolymers of vinyl pyridine and $C_{8-30}$ alkyl methacrylates, having a molecular weight range of from 1,500 to 2,000,000, preferably between 200,000 and 850,000 include (1) copolymer of 25% 2-methyl-5-vinyl pyridine and 75% stearyl methacrylate, molecular weight 200,000; (2) copolymer of 30% stearyl methacrylate, 51% lauryl methacrylate, 14% methyl methacrylate and 5% 2-methyl-5-vinyl pyridine, molecular weight 600,000; (3) copolymer of 14% methyl methacrylate, 54% lauryl methacrylate, 27% stearyl methacrylate and 5% 2-methyl-5-vinyl pyridine in weight ratio molecular weight 830,000; (4) copolymer of lauryl methacrylate, stearyl methacrylate and 2-methyl-5-vinyl pyridine in the weight ratio of 60:35:5, molecular weight 810,000; (5) copolymer of 2-methyl-5-vinyl pyridine, lauryl methacrylate and stearyl methacrylate in the weight ratio of 7.5:58:34.5, molecular weight 31,000; (6) N-vinyl pyrrolidone-alkyl acrylate copolymers; and (7) N,N-dimethylaminoethyl acrylate-alkyl acrylate copolymers.

The oil component of the lubricating compositions according to the present invention is especially designed for the preparation of multi-grade lubricants although single grade lubricants may be compounded as well. Still more specifically, the present combination of polymer and pour point depressant is especially beneficial in wax-containing lubricating oil cuts such as found in Mid-Continent oils, West Texas-Ellenburger crudes, East Texas crudes, Oklahoma crudes, Pennsylvania crudes, California crudes and similar waxy crudes which may be referred to as paraffin base crudes, naphthenic crudes or mixed base crudes as distinguished from asphalt base crudes.

While lubricating oils of any viscosity may be used as the base for the present compositions, the preferred oils are referred to as High Viscosity Index (HVI) 100 Neutral, HVI 250 Neutral and HVI Bright Stock as well as combinations of the same. Also included in this general term HVI for the purpose of this description, are very high viscosity index (VHVI) oils such as those prepared via hydrocracking of poor quality oils, such as low viscosity index (LVI) oils. More volatile oils may be employed for special purposes such as (HVI) 80N. These neutral oils are produced by well-known refining methods, such as distillation, dewaxing, deasphalting, dearomatizing, etc., as may be needed, dependant largely on the crude oil used. Typical properties of these HVI oils are the following:

| Designation | Properties of base oils | | | | |
| --- | --- | --- | --- | --- | --- |
|  | HVI | | | | VHVI 100 N |
|  | 80 N | 100 N | 250 N | 150 BS |  |
| Viscosity 210° F. (SUS) | 38.0 | 39.8 | 50.0 | 157 | 38.6 |
| Viscosity 100° F. (SUS) | 82 | 107 | 265 | 2,775 | 82.7 |
| VI | 103 | 93 | 93 | 95 | 126 |
| Gravity (lbs./gal.) | 7.08 | 7.20 | 7.33 | 7.44 | 7.21 |
| Pour point (° F.) | 5 | 20 | 20 | 15 | 0 |
| Flash point (° F.) | 360 | 405 | 430 | 575 | 400 |
| Aniline cloud point (° F.) | 203 | 213 | 220 | 260 | 226 |
| Percent Aromatics by U.V. | 15 | 11 | 14 | 27–40 | 5 |
| Percent weight S | .05 | .09 | .05 | .16 | .05 |
| ASTM color | L 0.5 | L 0.5 | L 1.0 | L 4.5 | L 0.5 |

The basic composition as described above may be used as such but preferably is modified by the presence of supplementary additives combined with the polymer and pour point depressant to provide the necessary stability, detergency, dispersancy, antiwear and anticorrosion properties required of modern lubricants according to increasingly severe automotive specifications.

Among such supplementary additives are polymeric succinic acid derivatives used as detergent-dispersants. These can be made by the process described in U.S. Patents to Hughes 3,215,632 issued Nov. 2, 1965; to Rense 3,215,707 issued Nov. 2, 1965; to Stuart et al. 3,202,678 issued Aug. 24, 1965, or Le Suer et al. Canadian 681,235 issued Mar. 3, 1964, and can be illustrated by examples (1) succinimide of mono-polyisobutylene) succinic anhydride and tetraethylene pentamine, the polyisobutylene radical having a molecular weight of about 1,000, (2) amine derivative of polyisobutyl monocarboxylic acid and tetraethylene pentamine having a molecular weight of about 1,000, (3) succinimide of mono(polypropylene) succinic anhydride and diethylene triamine, the polypropylene radical having a molecular weight of 800–1,500, (4) diimide of mono(polyisobutylene) succinic anhydride and tetraethylene pentamine, the polyisobutylene radical having a molecular weight of 800–1,500.

The most preferred ashless dispersants to be used in the lubricants of the present invention are achieved by providing oil-soluble compositions prepared by reacting under esterification conditions (A) at least one substituted polycarboxylic acid acylating agent containing an average of at least about 30 aliphatic carbon atoms per substituent with (B) at least one polyhydric alcohol in amounts such that there is at least one equivalent of polyhydric alcohol for each equivalent of substituted carboxylic acid acylating agent to form an ester-containing first reaction mixture and thereafter intimately contacting this first reaction mixture with (C) from about 0.025 to about 0.15 equivalent of at least one hydroxy-substituted primary amine per equivalent of (A). These reaction products and their preparation are described in Widmer et al. U.S. 3,576,743, issued Apr. 27, 1971. Still more preferably, (A) is further characterized in that it is a substantially saturated acylating agent produced by reacting ethylenically unsaturated carboxylic acidic reactant of the formula $$R_0 (COOH)_n$$

or the corresponding carboxylic acid halides, anhydrides, and esters where $R_0$ is characterized by the presence of at least one ethylenically unsaturated carbon-to-carbon covalent bond and $n$ is an integer of two to six, with an ethylenically unsaturated hydrocarbon or chlorinated hydrocarbon containing at least thirty aliphatic carbon atoms at a temperature within the range of 100°–300° C. with the proviso that said acylating agent may contain polar substituents to the extent that such polar substituents do not exceed 10% by weight of the hydrocarbon portion of the acylating agent excluding the weight of the carboxylic acid groups. The use of such detergents results in a substantial reduction (e.g., 15–50%) in the ash level compared to the use of other detergents which may otherwise be effective and satisfactory, such as the succinimides of high molecular weight mono(polyolefin)succinic anhydride and polyalkylene polyamines.

Alkaline earth metal overbased petroleum sulfonates also may be employed. The highly basic alkaline earth metal (Mg, Ca and/or Ba) petroleum sulfonate can be made by suitable means known in the art such as described in British Pats. 790,471 and 818,323 or Ellis et al. U.S. Pat. 2,865,956 issued Dec. 23, 1958. The basic calcium petroleum sulfonates (M.W. 300–800) are preferred. By basic sulfonate is meant that the end product has a basicity in excess of 20% and up to 1800% and preferably between 40% and 1400% in excess of that normally required to neutralize the acid to produce the normal salt. Other types of sulfonic acids in the molecular weight range of 350 to 800 and derived from olefinic polymers, alkyl aromatic compounds, e.g., alkylated benzene, or alkylated naphthalene also can be used in forming the basic magnesium, calcium and/or barium sulfonate salt, such as basic calcium diwax benzene sulfonate, basic diwax naphthalene sulfonate and the like, the basicity being in excess of about 50–180% and the molecular weight of the compound between 450 and 750. Similar alkaline earth metal alkyl phenates and alkyl salicylates also are useful.

Furthermore, dithiophosphates may be included as supplementary additives, e.g., Ca, Zn, Pb salts of alkylthiophosphates, as well as their thio derivatives, Zn bis(2-ethylhexyl)dithiophosphate, Zn dioctyl dithiophosphate Zn bis(alkylphenyl)dithiophospate, $P_2S_5$-terpene reaction product, phosphonates such as dibutyl methane phosphate, dibutyl trichloromethane phosphonate, dibutyl monochloromethane phosphate, dibutyl chlorobenzene phosphonate, and the like. The full esters of pentavalent phosphorus acids may be used, such as triphenyl, tricresyl, trilauryl and tristearyl orthophosphates or potassium salt of $P_2S_5$-terpene reaction products or zinc above, like Zn di($C_{4-10}$ alkyl)dithiophosphate, e.g., Zn bis(2-ethylhexyl)dithiophosphate, Zn bis(alkylphenyl)dithiophosphate. Corresponding dithiocarbamates, preferably zinc salts, also may be employed.

Anti-foaming agents such as silicone polymers, e.g., dimethyl silicone polymer, can also be used.

When desired, additional improvements with respect to oxidation stability and scuffing inhibition can be imparted to the oil compositions of the invention by incorporating small amounts (0.01%–2%, preferably 0.1%–1%) of phenolic antioxidants such as alkylphenols, e.g., 2-6-di-tert.butyl - 4 - methylphenol or p,p' - methylene bisphenols such as 4,4' - methylene - bis(2,6 - ditert.butylphenol) or arylamines such as phenylalphanaphthylamine; dialkyl sulfides and mixtures thereof, e.g., dibenzyl disulfide or didodecyl sulfide. Anti-scuffing agents include esters of metal salts or organic phosphites, phosphates, phosphonates and their thio derivatives, such as $C_{3-18}$ trialkyl phosphites, or phosphonates, e.g., tributyl-, trioctyl-, trilauryl-, tristearyl-, tricyclohexyl-, tribenzyl-, tricresyl- or triphenyl phosphites or phosphates.

Preferred formulations incorporating the present invention are as follows:

| Components | Percent by weight |
|---|---|
| Hydrogenated Polyisoprene | 0.1–10 |
| Pour Point Depressant | 0.1–5 |
| Oil Soluble Metal Thiophosphate | 0.01–0.3 |
| Ashless detergent | 0.1–8.5 |
| Overbased alkaline earth metal alkaryl sulfonate (Basis sulfated ash) | 0.05–3.5 |
| Oil | Balance |

In the following examples, shear stability is indicated by Shear Stability Index (SSI). In arriving at the numerical values, $$SSI = \frac{V_i - V_f}{V_i - V_b} \times 100$$

where $V_i$, $V_f$ and $V_b$ are 210° F. SUS viscosities of the modified oil before use, of the same oil after a stated shear test, and of the base oil, respectively.

EXAMPLE I

Three polyisoprenes were prepared: a first polymer was prepared by sodium polymerization according to the directions given in U.S. 2,798,853 this was a sodium polymerized polyisoprene having an average molecular weight of about 50,000 and a micro structure of 45% 1,4 addition, 5% 1,2 addition and 50% 3,4 addition with a broad molecular weight distribution. The polymer was completely hydrogenated and then tested for viscosity. It was found to have an intrinsic viscosity of 0.6 in toluene.

Lithium initiated polyisoprenes were prepared by polymerization with lithium secondary butyl in hydrocarbon solution. These had average molecular weights of 41,000 and 98,000 respectively, both of them having over 90% 1,4 addition. Following essentially complete hydrogenation, each of the polymers was dispersed in a lubricating oil base comprising 75% HVI 100 neutral and 25% HVI 250 neutral, the oil blend also containing 0.5% of a commercial polymethacrylate pour point depressant. The blends were then tested in an ultrasonic shear apparatus for 30 minutes at 9,170 cycles per second at 100° F. Results shown in Table I clearly indicate the superior shear stability of the lithium-polymerized polyisoprene polymers over the sodiulm-polymerized polyisoprene.

TABLE I

| Polymer precursor | Average molecular wt.×10⁻³ | Percent 1,4 | Shear stability index 2% concentrate | Shear stability index 3% concentrate |
|---|---|---|---|---|
| Sodium-polymerized polyisoprene | 50 | 45 | 45 | 39 |
| Lithium-polymerized polyisoprene | 41 | 90+ | 9 | 7 |
| Do | 98 | 90+ | 7 | 11 |

EXAMPLE II

A completely hydrogenated polyisoprene having an average molecular weight of 88,000 was used to improve the viscosity index of a naphthenic midcontinent lubricating oil. The properties of base oil and of the oil modified with the hydrogenated polyisoprene are given in Table II below together with further data showing that the pour point of the compositions may be effectively reduced by the presence of a commercially available polymethacrylate.

TABLE II

| | Base oil | Base oil plus 1.1% hydrogen polyisoprene, 88,000 molecular wt. |
|---|---|---|
| Viscosity index | 114 | 148 |
| Pour point, ° F | +15 | +15 |
| Pour point, ° F. with 0.5% polymethacrylate | −20 | −20 |
| Shear stability index | 0 | 5 |

The polyisoprene (prior to hydrogenation) has a Cis 1,4-content in the order of 92%.

EXAMPLE III

Completely hydrogenated lithium-polymerized polyisoprene polymers having (prior to hydrogenation) 1,4-contents in the order of 92% and molecular weights indicated in Table II were compared in SAE 10W/40 formulations for their low-temperature fluidity in the General Motors pour test with two commercially available ethylene-propylene random copolymers having comparable thickening efficiency and shear stability. The results in Table III clearly show the advantage of the hydrogenated polyisoprene polymers over the ethylene-propylene copolymers. Both of the ethylene-propylene copolymers caused the oils to solidify at −10° F. under the low shear of the General Motors pour test, thus resulting in no movement at −20° F., the temperature of the specification on SAE 5W oils. The oils containing the hydrogenated polyisoprene polymers, however, gave good pour times at −20° F. and were still fluid at temperatures below −30° F.

TABLE III

| Polymer | Average molecular wt. ×10⁻³ | Polymer concentrate,ᵃ percent wt. | Viscosityᵇ at 210° F., SUS | Viscosityᶜ at 0° F., poise | GM pour time, at −20° F., seconds |
|---|---|---|---|---|---|
| Hydrogenated lithium-polymerized polyisoprene | 41 | 3.30 | 77.1 | 22.4 | 6.8 |
| Do | 88 | 1.95 | 78.9 | 18.1 | 9.0 |
| Do | 125 | 1.55 | 76.6 | 17.7 | 8.2 |
| Do | 231 | 0.97 | 76.7 | 15.2 | 6.0 |
| Ethylene-propylene random copolymer | 112 | 1.0 | 74.7 | (ᵈ) | 200 |
| Do | 90 | 1.4 | 77.0 | (ᵈ) | 200 |

ᵃ Base oil is sour 100 N containing 10.95% wt. SD-quality dispersant/inhibitor additive package.
ᵇ Kinematic viscosity, ASTM D-445.
ᶜ Cold cranking simulator viscosity, ASTM D-2602.
ᵈ Measurement not made because of strong Weissenberg effect.

EXAMPLE IV

The hydrogenated-lithium polyisoprene described in previous examples having an average molecular weight of 125,000 was dispersed at 1.9% w. concentration in an HVI 100 Neutral lubricating oil in the presence of 0.5% w. of a zinc dialkyl similar lubricating oil composition wherein 1.35% w. of an ethylene-propylene random copolymer was employed in place of the polyisoprene. The viscosity was determined periodically throughout the test and the shear stability was expressed in terms of the percent loss of the viscosity increase at 210° F. due to the addition of the polymer. After 22 hours in the test, the oil containing hydrogenated polyisoprene showed an 8% loss of viscosity while the ethylene-propylene copolymer containing oil showed a 28% loss of viscosity in the same period.

I claim:
1. A lubricating composition comprising:
   (a) a major proportion of a lubricating oil; and
   (b) a minor but viscosity index improving amount of a hydrogenated polyisoprene homopolymer, said polymer having been produced by solution polymerization with a lithium-hydrocarbyl initiator, having a 1,4-content prior to hydrogenation of at least about

85% and an average molecular weight between about 40,000 and 225,000, said polymer having been hydrogenated sufficiently to reduce at least about 80% of its double bonds.

2. A composition according to claim 1 wherein the polymer is polyisoprene which is hydrogenated sufficiently to reduce 80–95% of its double bonds.

3. A composition according to claim 2 wherein the polyisoprene has been hydrogenated to reduce more than 95% of its double bonds.

4. A composition according to claim 2 wherein the average molecular weight of the polyisoprene is between about 65,000 and 125,000.

5. A composition according to claim 2 wherein the polyisoprene is a linear polymer.

6. A composition according to claim 2 wherein the polyisoprene is a branched homopolyisoprene.

7. A composition according to claim 2 containing in addition a minor but pour point depressing amount of a pour point depressant.

References Cited

UNITED STATES PATENTS

| | | | |
|---|---|---|---|
| 3,312,621 | 4/1967 | Brownawell et al. | 252—59 |
| 3,547,821 | 12/1970 | McCoy et al. | 252—59 |
| 2,798,853 | 7/1957 | Young et al. | 252—59 X |

W. H. CANNON, Primary Examiner

U.S. Cl. X.R.

260—94.7 H